United States Patent [19]
Helfritch

[11] Patent Number: 4,960,445
[45] Date of Patent: Oct. 2, 1990

[54] PROCESS FOR REMOVING $SO_2$ AND FLY ASH FROM FLUE GAS

[75] Inventor: Dennis J. Helfritch, Flemington, N.J.

[73] Assignee: Research-Cottrell, Somerville, N.J.

[21] Appl. No.: 437,334

[22] Filed: Nov. 20, 1989

Related U.S. Application Data

[63] Continuation of Ser. No. 764,715, Aug. 12, 1985, abandoned.

[51] Int. Cl.$^5$ .............................................. B03C 3/00
[52] U.S. Cl. ............................................ 55/5; 55/107; 423/244
[58] Field of Search ................ 55/5, 107; 423/244 A

[56] References Cited

U.S. PATENT DOCUMENTS

| | | | |
|---|---|---|---|
| 2,924,294 | 2/1960 | Johnstone | 55/107 |
| 3,589,863 | 6/1971 | Frevel et al. | 55/134 |
| 3,808,774 | 5/1974 | Teller | 55/74 X |
| 3,852,410 | 12/1974 | Rivers et al. | 55/73 X |
| 3,933,978 | 1/1976 | Margraf | 55/73 X |
| 3,995,005 | 11/1976 | Teller | 55/262 |
| 4,070,162 | 1/1978 | Kober et al. | 55/262 X |
| 4,169,714 | 10/1979 | Calvert | 55/5 |
| 4,220,478 | 9/1980 | Schuff | 55/107 |
| 4,273,750 | 6/1981 | Hollett et al. | 55/262 |
| 4,290,786 | 9/1981 | Schuff | 55/107 |
| 4,319,890 | 3/1982 | Teller | 55/6 |

FOREIGN PATENT DOCUMENTS

| | | | |
|---|---|---|---|
| 2153777 | 5/1973 | Fed. Rep. of Germany | 55/262 |
| 7611236 | 4/1977 | Netherlands | 55/262 |

OTHER PUBLICATIONS

Hackh's Chemical Dictionary, 4th Ed., McGraw-Hill Book Co., N.Y., 1969, pp. 444, 694.

Primary Examiner—Bernard Nozick
Attorney, Agent, or Firm—Kerkam, Stowell, Kondracki & Clarke

[57] ABSTRACT

A process is disclosed for enhanced removal of $SO_2$ and fly ash from flue gas by directing the flue gas and an $SO_2$ sorbent through an electrostatic charger and then through a bag filter where electrostatically improved flue gas/sorbent contact occurs and where the suspended fly ash and sodium sulfate are removed and the gas stream is discharged.

4 Claims, 1 Drawing Sheet

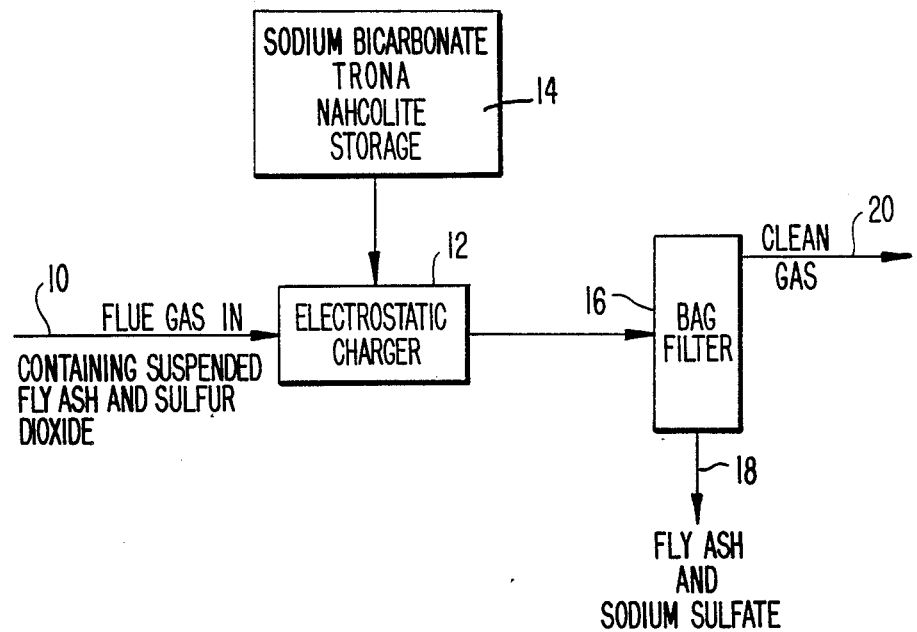

PROCESS FOR REMOVING SO₂ AND FLY ASH FROM FLUE GAS

This is a continuation of Application Ser. No. 764,715, filed Aug. 12, 1985, now abandoned.

FIELD OF THE INVENTION

This invention is directed to a process for enhancing the removal of $SO_2$ and fly ash from flue gases and to such a process wherein the ratio of $SO_2$ sorbent to $SO_2$ may be reduced resulting in a substantial saving in the cost of sorbent for plant operation.

BACKGROUND

It is known that the technique of particle charging prior to fabric filtration results in a pressure drop reduction as particle charging prior to fabric filtration produces a charged particle bed on the filter surface which is more open and less densely packed than when non-charged particles are collected. It is also known that $SO_2$ may be removed from flue gases by certain sorbents such as sodium bicarbonate and Nahcolite.

Examples of prior art are:
Schuff——4,290,786;
Schuff—4,220,478;
Johnstone——2,924,294;
Calvert——4,169,714.

BRIEF SUMMARY OF THE INVENTION

The present invention is based on a process for removing $SO_2$ and fly ash from flue gases by directing a particulate $SO_2$ sorbent, such as sodium bicarbonate or Nahcolite, and flue gas containing suspended fly ash and sulfur dioxide through an electrostatic charger and thereafter directing the charged sorbent and flue gas through a bag filter to separate the fly ash and formed sodium sulfate from the flue gas.

BRIEF DESCRIPTION OF THE DRAWING

The drawing is a flow diagram of apparatus for carrying out the process of the invention.

DETAILED DESCRIPTION OF PREFERRED EMBODIMENTS

Referring to the drawing directional arrow 10 represents the flow of flue gas containing suspended fly ash and sulfur dioxide into an electrostatic charger 12 of conventional design. Also directed into the electrostatic charger is particulate $SO_2$ sorbent preferably sodium bicarbonate or its naturally occurring form, such as Nahcolite or Trona, from a storage bin 14.

The combined flue gas and $SO_2$ sorbent are then directed to the bag filter 16 where the electrostatically charged sorbent creates a bed of loosely packed particles. Due to reduced resistance to gas flow, this bed of sorbent can be allowed to increase in depth, resulting in enhanced flue gas contact and enhanced conversion of the $SO_2$ to sodium sulfate. The discharge from the bag filter 16 is fly ash and sodium sulfate as at 18 and clean gas as at 20. Nahcolite ($NaHCO_3$) is most often considered as the $SO_2$ sorbent of choice, and $Na_2/S$ ratio of 1.2 or higher is generally considered to be needed for 90% $SO_2$ removal. Following the teachings of the present invention reduces the sorbent to $SO_2$ ratio such that $Na_2/S$ ratio can be lowered to 1.0.

EXAMPLE

Considering a 500 MW power plant using 12,000 BTU/pound, 2% sulfur coal and operating 7,000 hours/year a $Na_2/S$ ratio reduction from 1.2 to 1.0 and assuming a Nahcolite cost of $75.00 per ton would result in a yearly saving of approximated $2.4 million. This can be compared to the estimated installation cost of the electrostatic charger of 0.5 million. Preferably the sorbent particles are in the size range of from about 1 micron to about 100 microns.

The electrostatic charger makes use of high voltage corona discharge, such as is utilized in electrostatic precipitators.

I claim:
1. A process for removal of $SO_2$ and fly ash from flue gas and reducing the ratio of $SO_2$ sorbent to $SO_2$ comprising the steps directing a particulate $SO_2$ sorbent in the size range of from about 1 micron to about 100 microns selected from the group consisting of sodium bicarbonate, Nahcolite and Trona into an electrostatic charger utilizing corona discharge and contacting the flue gas containing suspended fly ash and sulfur dioxide with the $SO_2$ sorbent; directing the charged sorbent and flue gas to a bag filter; permitting the charged particulate sorbent and fly ash to form a layer on the surface of the bag filter where the $SO_2$ converts the $SO_2$ sorbent to sodium sulfate as the flue gas passes through the bag filter.

2. The process as defined in claim 1 wherein the sorbent is sodium bicarbonate.

3. The process as defined in claim 1 wherein the sorbent is Nahcolite.

4. The process as defined in claim 1 wherein the sorbent is Trona.

* * * * *